US012671495B2

(12) United States Patent
Zhang et al.

(10) Patent No.: US 12,671,495 B2
(45) Date of Patent: Jun. 30, 2026

(54) OPTICAL COMMUNICATION SYSTEM, VEHICLE, AND INDUSTRIAL OPTICAL NETWORK

(71) Applicant: HUAWEI TECHNOLOGIES CO., LTD., Shenzhen (CN)

(72) Inventors: Xin Zhang, Dongguan (CN); Yanbo Li, Dongguan (CN); Tianhai Chang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 216 days.

(21) Appl. No.: 18/425,989

(22) Filed: Jan. 29, 2024

(65) Prior Publication Data

US 2024/0171270 A1     May 23, 2024

Related U.S. Application Data

(63) Continuation of application No. PCT/CN2022/106266, filed on Jul. 18, 2022.

(51) Int. Cl.
*H04B 10/032* (2013.01)
*H04B 10/038* (2013.01)

(52) U.S. Cl.
CPC ......... *H04B 10/032* (2013.01); *H04B 10/038* (2013.01)

(58) Field of Classification Search
CPC .............................. H04B 10/032; H04B 10/38
(Continued)

(56) References Cited

U.S. PATENT DOCUMENTS

| 8,625,991 B1 | 1/2014 | Sindhu |
| 9,363,021 B2 | 6/2016 | Fujimura et al. |

(Continued)

FOREIGN PATENT DOCUMENTS

| CN | 101420285 A | | 4/2009 |
| CN | 103916206 A | * | 7/2014 |

(Continued)

OTHER PUBLICATIONS

Chowdhury et al., "A Novel Centrally Managed Self-Protected Bi-directional WDM-PON Architecture using Optical carrier Suppression, Separation Technique and Wavelength Sharing Scheme," LEOS 2007, total 2 pages, XP031160859 (Oct. 1, 2007).

*Primary Examiner* — Amritbir K Sandhu
(74) *Attorney, Agent, or Firm* — Leydig, Voit & Mayer, Ltd.

(57) ABSTRACT

This application provides an optical communication system, a vehicle, and an industrial optical network, and relates to the field of optical communications. A light source module in the optical communication system can be connected to a group of first nodes separately through two carrier bearer networks. Therefore, even if either carrier bearer network is faulty, the other carrier bearer network can continue to transmit an optical carrier, thereby effectively improving reliability of optical carrier transmission, and further improving reliability of the optical communication system. In addition, because the two carrier bearer networks are independent of each other and can work simultaneously, after either carrier bearer network is faulty, no failover is needed. This can avoid interrupted transmission of the optical carrier caused by the failover, and further avoid interrupted transmission of a service optical signal.

17 Claims, 5 Drawing Sheets

(58) Field of Classification Search
USPC ........................................................ 398/204
See application file for complete search history.

(56) References Cited

U.S. PATENT DOCUMENTS

| | | | | |
|---|---|---|---|---|
| 11,245,970 B1 * | 2/2022 | Jia | ....................... | H04Q 11/0005 |
| 11,689,296 B2 * | 6/2023 | Ueno | .................... | H04J 3/0658 |
| | | | | 398/164 |
| 12,395,768 B1 * | 8/2025 | Zhang | ................. | H04B 10/614 |
| 2010/0158512 A1 * | 6/2010 | Chang | ................ | H04J 14/0246 |
| | | | | 398/7 |
| 2020/0052787 A1 | 2/2020 | Menard et al. | | |
| 2021/0376947 A1 * | 12/2021 | Hu | ....................... | H04B 10/291 |

FOREIGN PATENT DOCUMENTS

| | | | | | |
|---|---|---|---|---|---|
| CN | 106533543 A | | 3/2017 | | |
| EP | 2020757 A1 * | | 2/2009 | ......... | H04B 11/0067 |
| EP | 2897309 A1 * | | 7/2015 | ......... | H04Q 11/0067 |
| JP | 2003229816 A | | 8/2003 | | |
| JP | 2004172989 A | | 6/2004 | | |
| KR | 100833504 B1 * | | 5/2008 | ............... | H04J 3/14 |
| WO | 2014021258 A1 | | 2/2014 | | |
| WO | WO-2019140602 A1 * | | 7/2019 | ........... | H04W 72/52 |
| WO | 2020250640 A1 | | 12/2020 | | |

* cited by examiner

1

OPTICAL COMMUNICATION SYSTEM, VEHICLE, AND INDUSTRIAL OPTICAL NETWORK

CROSS-REFERENCE TO RELATED APPLICATIONS

This application is a continuation of International Application No. PCT/CN2022/106266, filed on Jul. 18, 2022, which claims priority to Chinese Patent Application No. 202110877150.0, filed on Jul. 31, 2021. The disclosures of the aforementioned applications are hereby incorporated by reference in their entireties.

TECHNICAL FIELD

This application relates to the field of optical communications, and in particular, to an optical communication system, a vehicle, and an industrial optical network.

BACKGROUND

In a conventional technology, signal interactions between service nodes are generally implemented by using electrical signals. However, because a transmission rate of an electrical signal is limited, and a transmission rate of an optical signal is higher, implementing the signal interactions between the service nodes by using an optical communication system becomes a research hotspot. Reliability of the optical communication system is one of important research topics.

SUMMARY

This application provides an optical communication system, a vehicle, and an industrial optical network. The optical communication system has high reliability.

According to an aspect, an optical communication system is provided. The optical communication system includes a light source module, a first carrier bearer network, a second carrier bearer network, a group of first nodes, a first service bearer network, and a group of second nodes. The first carrier bearer network and the second carrier bearer network provide backup for each other. The light source module is connected to the group of first nodes separately through the first carrier bearer network and the second carrier bearer network. The light source module is configured to transmit an optical carrier to the group of first nodes separately through the first carrier bearer network and the second carrier bearer network. The group of first nodes is connected to the group of second nodes through the first service bearer network. Each first node is configured to modulate, based on a service electrical signal, the received optical carrier to obtain a service optical signal, and transmit the service optical signal to at least one of the second nodes through the first service bearer network.

That the first carrier bearer network and the second carrier bearer network provide backup for each other means that the two carrier bearer networks are independent of each other and can work simultaneously. Correspondingly, the light source module can transmit the optical carrier through the two carrier bearer networks simultaneously. Because the light source module is connected to the group of first nodes through the two carrier bearer networks, even if either carrier bearer network is faulty, the other carrier bearer network can continue to transmit an optical carrier, thereby effectively improving reliability of optical carrier transmission, and further improving reliability of the optical communication system. In addition, because the two carrier bearer networks are independent of each other and can work simultaneously, after either carrier bearer network is faulty, no failover is needed. This can avoid interrupted transmission of the optical carrier caused by the failover.

In a possible implementation, the light source module includes a first light source and a second light source that provide backup for each other. The first light source is connected to the group of first nodes through the first carrier bearer network. The second light source is connected to the group of first nodes through the second carrier bearer network. That the first light source and the second light source provide backup for each other means that the two light sources are independent of each other and can work simultaneously. Reliability of the light source module can be effectively improved by providing the two light sources that provide backup for each other. In addition, because the two light sources can work simultaneously, when either light source is faulty, there is no need to switch, by using an optical switching switch, a light source for providing an optical carrier. In other words, no failover is needed. In this way, interrupted transmission of the optical carrier caused by the failover can be avoided.

Optionally, both the first light source and the second light source may be single-wavelength light sources or wide-spectrum light sources. The single-wavelength light source can provide an optical carrier with a single wavelength. The wide-spectrum light source can provide an optical carrier of which band width is greater than a threshold. In other words, the optical carrier provided by the wide-spectrum light source has a wide band. The light source module further includes a first splitter and a second splitter. The first light source is connected to the first carrier bearer network through the first splitter. The first splitter is configured to split an optical carrier provided by the first light source, and transmit a split optical carrier to each first node separately through the first carrier bearer network. The second light source is connected to the second carrier bearer network through the second splitter. The second splitter is configured to split an optical carrier provided by the second light source, and transmit a split optical carrier to each first node separately through the second carrier bearer network.

If both the first light source and the second light source are single-wavelength light sources, wavelengths of optical carriers provided by the two light sources are different, to avoid interference between the optical carriers. If both the first light source and the second light source are wide-spectrum light sources, because the wide-spectrum light source is not a coherent light source, the bands of optical carriers provided by the two light sources may be the same or may be different. Because costs of a single-wavelength light source, a wide-spectrum light source, and a splitter are all low, a combination of the single-wavelength light source (or the wide-spectrum light source) and the splitter is used to provide optical carriers for a plurality of first nodes, so that costs of the light source module can be effectively reduced.

Optionally, both the first light source and the second light source may be multi-wavelength light sources. The first light source is configured to output a plurality of single-wavelength optical carriers in parallel to the first carrier bearer network. The first carrier bearer network can transmit an optical carrier with a wavelength to each first node. The second light source is configured to output a plurality of single-wavelength optical carriers in parallel to the second carrier bearer network. The second carrier bearer network can transmit an optical carrier with a wavelength to each first node. Wavelengths of optical carriers transmitted by the first carrier bearer network and the second carrier bearer network to a same first node are different, to avoid interference between the optical carriers.

Because the multi-wavelength light source can output a plurality of single-wavelength optical carriers in parallel, and an optical carrier of each wavelength can be transmitted to one first node without splitting, it can be ensured that power of the optical carrier received by the first node is high, thereby ensuring that transmission performance of a service optical signal obtained by modulating the optical carrier is better.

Optionally, each first node includes a first optical path coupler and an electro-optic modulator. The first optical path coupler is separately connected to the first carrier bearer network, the second carrier bearer network, and the electro-optic modulator. The first optical path coupler is configured to couple an optical carrier transmitted by the first carrier bearer network and an optical carrier transmitted by the second carrier bearer network, and transmit a coupled optical carrier to the electro-optic modulator. The electro-optic modulator is connected to the first service bearer network. The electro-optic modulator is configured to modulate, based on the service electrical signal, an optical carrier transmitted by the first optical path coupler, to obtain a service optical signal, and transmit the service optical signal to at least one of the second nodes through the first service bearer network.

Because the two carrier bearer networks can each transmit optical carriers to the first node, an optical path coupler may be disposed in the first node, to couple two optical carriers. If wavelengths or bands of the two optical carriers received by the first node are different, the first optical path coupler may be a multiplexer or an optical combiner. If the bands of the two optical carriers received by the first node are the same, the first optical path coupler is an optical combiner.

Optionally, the optical communication system may further include a second service bearer network. The second service bearer network and the first service bearer network provide backup for each other. The group of first nodes is further connected to the group of second nodes through the second service bearer network, and each first node is further configured to transmit the service optical signal to at least one of the second nodes through the second service bearer network.

That the second service bearer network and the first service bearer network provide backup for each other means that the two service bearer networks are independent of each other and can work simultaneously. Because the first node can be connected to the second node through the two service bearer networks, even if either service bearer network is faulty, the other service bearer network can continue to transmit a service optical signal, thereby effectively improving reliability of service optical signal transmission, and further improving reliability of the optical communication system. In addition, because the two service bearer networks are independent of each other and can work simultaneously, after either service bearer network is faulty, no failover is needed. This can avoid interrupted transmission of the service optical signal caused by the failover.

Optionally, each first node includes a first optical path coupler, an electro-optic modulator, and an optical path decoupler. The first optical path coupler is separately connected to the first carrier bearer network, the second carrier bearer network, and the electro-optic modulator. The first optical path coupler is configured to couple an optical carrier transmitted by the first carrier bearer network and an optical carrier transmitted by the second carrier bearer network, and transmit a coupled optical carrier to the electro-optic modulator. The electro-optic modulator is connected to the optical path decoupler. The electro-optic modulator is configured to modulate, based on the service electrical signal, an optical carrier transmitted by the first optical path coupler, to obtain a service optical signal, and transmit the service optical signal to the optical path decoupler. The optical path decoupler is further separately connected to the first service bearer network and the second service bearer network. The optical path decoupler is configured to decouple the service optical signal, and transmit a decoupled service optical signal to at least one of the second nodes separately through the first service bearer network and the second service bearer network.

If wavelengths or bands of the two optical carriers received by the first node are different, the optical path decoupler is a demultiplexer. If bands of the two optical carriers received by the first node are the same, the optical path decoupler is a splitter. Because the first node uses the first optical path coupler to couple optical carriers transmitted by the two carrier bearer networks, and uses the optical path decoupler to decouple the service optical signal, only one electro-optic modulator needs to be disposed in the first node. In this way, costs of the first node are effectively reduced, and costs of the optical communication system are further reduced.

Optionally, each first node includes a first electro-optic modulator and a second electro-optic modulator that provide backup for each other. The first electro-optic modulator is separately connected to the first carrier bearer network and the first service bearer network. The first electro-optic modulator is configured to modulate, based on the service electrical signal, an optical carrier transmitted by the first carrier bearer network, to obtain a service optical signal, and transmit the modulated service optical signal to at least one of the second nodes through the first service bearer network. The second electro-optic modulator is separately connected to the second carrier bearer network and the second service bearer network. The second electro-optic modulator is configured to modulate, based on the service electrical signal, an optical carrier transmitted by the second carrier bearer network, to obtain a service optical signal, and transmit the modulated service optical signal to at least one of the second nodes through the second service bearer network. Because two electro-optic modulators are disposed in the first node, when either electro-optic modulator is faulty, the other electro-optic modulator can still continue to work. In this way, reliability of the first node and the system is effectively improved.

Optionally, each second node includes a second optical path coupler and a photoelectric receiver. The second optical path coupler is separately connected to the first service bearer network, the second service bearer network, and the photoelectric receiver. The second optical path coupler is configured to couple a service optical signal transmitted by the first service bearer network and a service optical signal transmitted by the second service bearer network, and transmit a coupled service optical signal to the photoelectric receiver. The photoelectric receiver is configured to demodulate the service optical signal transmitted by the second optical path coupler. If wavelengths or bands of the two service optical signals received by the second node are different, the second optical path coupler is a multiplexer or an optical combiner. If the bands of the two service optical signals received by the second node are the same, the second optical path coupler is an optical combiner. Because the second node uses the second optical path coupler to couple service optical signals transmitted by the two service bearer networks, only one photoelectric receiver needs to be disposed in the second node. In this way, costs of the second node are effectively reduced, and costs of the optical communication system are further reduced.

Optionally, each second node includes a first photoelectric receiver and a second photoelectric receiver that provide backup for each other. The first photoelectric receiver is connected to the first service bearer network, and is configured to demodulate a first service optical signal transmitted by the first service bearer network. The second photoelectric receiver is connected to the second service bearer network, and is configured to demodulate a second service optical signal transmitted by the second service bearer network. Because two photoelectric receivers are disposed in the second node, when either photoelectric receiver is faulty, the other photoelectric receiver can still continue to work. In this way, reliability of the second node and the system is effectively improved.

Optionally, the first service bearer network may be a star network. The star network can implement multipoint-to-multipoint communication, thereby effectively improving flexibility and efficiency of communication between nodes. In addition, a fault of a single node in the star network does not affect normal communication between other nodes, and reliability of the star network is high.

Optionally, the first service bearer network may include a first optical waveguide, a service distributer, and a second optical waveguide. Both the first optical waveguide and the second optical waveguide are separately connected to the group of first nodes, the group of second nodes, and the service distributer. The service distributer is configured to receive a service optical signal from at least one node of the group of first nodes and the group of second nodes through the first optical waveguide, couple the received service optical signal, split a coupled service optical signal, and transmit a split service optical signal to the group of first nodes and the group of second nodes separately through the second optical waveguide. The optical waveguide may be a light-guide fiber (that is, an optical fiber). Because the service distributer can broadcast, to each node in the optical communication system, a service optical signal sent by any node, flexible multipoint-to-multipoint communication can be implemented.

Optionally, the service distributer may be a star coupler. An input end of the star coupler is connected to the first optical waveguide, and an output end is connected to the second optical waveguide. The star coupler can combine at least one channel of service optical signals received by the input end of the star coupler, and then split a combined service optical signal and transmit the split service optical signal to each node through the second optical waveguide.

Alternatively, if a light source in the light source module is a multi-wavelength light source, the service distributer may include an arrayed waveguide grating (AWG) and a third splitter. One end of the AWG is connected to the first optical waveguide, the other end of the AWG is connected to an input end of a third splitter. The output end of the third splitter is connected to the second optical waveguide. The AWG can multiplex at least one channel of received service optical signals, and then transmit a multiplexed signal to the third splitter. The third splitter can split the service optical signal transmitted by the AWG, and then transmit a split service optical signal to each node through the second optical waveguide.

According to another aspect, an optical communication system is provided. The optical communication system includes a light source module, a first carrier bearer network, a group of first nodes, a first service bearer network, a second service bearer network, and a group of second nodes. The first service bearer network and the second service bearer network provide backup for each other. The light source module is connected to the group of first nodes through the first carrier bearer network. The light source module is configured to transmit an optical carrier to the group of first nodes through the first carrier bearer network and the second carrier bearer network. The group of first nodes are connected to the group of second nodes separately through the first service bearer network and the second service bearer network. Each first node is configured to modulate, based on a service electrical signal, the received optical carrier to obtain a service optical signal, and transmit the service optical signal to at least one of the second nodes separately through the first service bearer network and the second service bearer network.

That the first service bearer network and the second service bearer network provide backup for each other means that the two service bearer networks are independent of each other and can work simultaneously. Because the first node can transmit the service optical signal to the second node separately through the two service bearer networks, even if either service bearer network is faulty, the other service bearer network can continue to transmit a service optical signal, thereby effectively improving reliability of service optical signal transmission, and further improving reliability of the optical communication system. In addition, because the two service bearer networks are independent of each other and can work simultaneously, after either service bearer network is faulty, no failover is needed. This can avoid interrupted transmission of the service optical signal caused by the failover.

According to still another aspect, a vehicle is provided. The vehicle includes a vehicle-mounted controller, a vehicle-mounted sensor, a vehicle-mounted actuator, and the optical communication system according to any one of the foregoing aspects. The vehicle-mounted sensor is connected to a first node in the optical communication system, and is configured to provide a service signal for the first node. The vehicle-mounted controller is connected to a second node in the optical communication system, and is configured to receive a service electrical signal transmitted by the second node. Alternatively, the vehicle-mounted controller is connected to a first node in the optical communication system, and is configured to provide a service signal for the first node. The vehicle-mounted actuator is connected to a second node in the optical communication system, and is configured to receive a service electrical signal transmitted by the second node. In other words, the optical communication system can implement signal interactions between the vehicle-mounted sensor and the vehicle-mounted controller, or implement signal interactions between the vehicle-mounted controller and the vehicle-mounted actuator.

In a running process of the vehicle, if communication between the vehicle-mounted sensor and the vehicle-mounted controller is interrupted, or communication between the vehicle-mounted controller and the vehicle-mounted actuator is interrupted, a serious consequence may be caused, for example, the vehicle may be out of control. Because reliability of the optical communication system used by the vehicle provided in this application is high, a probability of communication interruption between vehicle-mounted components can be effectively reduced, thereby ensuring reliability of the vehicle during running.

According to yet another aspect, an industrial optical network is provided. The industrial optical network includes an industrial controller, an industrial sensor, an industrial actuator, and the optical communication system according to any one of the foregoing aspects. The industrial sensor is connected to a first node in the optical communication system, and is configured to provide a service signal for the first node. The industrial controller is connected to a second node in the optical communication system, and is configured to receive a service electrical signal transmitted by the second node. Alternatively, the industrial controller is connected to a first node in the optical communication system, and is configured to provide a service signal for the first node. The industrial actuator is connected to a second node in the optical communication system, and is configured to receive a service electrical signal transmitted by the second node. In other words, the optical communication system can implement signal interactions between the industrial sensor and the industrial controller, or implement signal interactions between the industrial controller and the industrial actuator. Reliability of the optical communication system used by the industrial optical network provided in this application is high, so that a probability of communication interruption between industrial components can be effectively reduced, thereby ensuring reliability of the industrial optical network during running.

In conclusion, this application provides an optical communication system, a vehicle, and an industrial optical network. A light source module in the optical communication system can be connected to a group of first nodes separately through two carrier bearer networks, even if either carrier bearer network is faulty, the other carrier bearer network can continue to transmit an optical carrier, thereby effectively improving reliability of optical carrier transmission, and further improving reliability of the optical communication system. In addition, because the two carrier bearer networks are independent of each other and can work simultaneously, after either carrier bearer network is faulty, no failover is needed. This can avoid interrupted transmission of the optical carrier caused by the failover, and further avoid interrupted transmission of a service optical signal.

DESCRIPTION OF EMBODIMENTS

The following describes an optical communication system, a vehicle, and an industrial optical network provided in embodiments of this application in detail with reference to the accompanying drawings.

Figure 1:
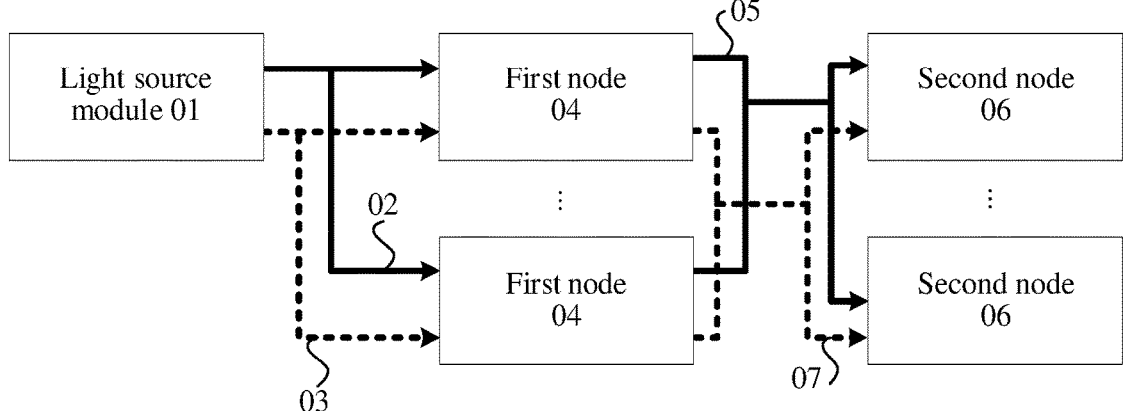
FIG. 1 is a schematic diagram of a structure of an optical communication system according to an embodiment of this application.

FIG. 1 is a schematic diagram of a structure of an optical communication system according to an embodiment of this application. As shown in FIG. 1, the optical communication system includes a light source module 01, a first carrier bearer network 02, a second carrier bearer network 03, a group of first nodes 04, a first service bearer network 05, and a group of second nodes 06. The first carrier bearer network 02 and the second carrier bearer network 03 provide backup for each other. That the first carrier bearer network 02 and the second carrier bearer network 03 provide backup for each other means that the two carrier bearer networks are independent of each other and can work simultaneously. In other words, the two carrier bearer networks provide hot backup for each other. The light source module 01 is a component configured to provide an optical carrier, and may also be referred to as a light source module, a light source assembly, or the like.

Refer to FIG. 1. The light source module 01 is connected to the group of first nodes 04 separately through the first carrier bearer network 02 and the second carrier bearer network 03. The light source module 01 is configured to transmit an optical carrier to the group of first nodes 04 separately through the first carrier bearer network 02 and the second carrier bearer network 03. Because the first carrier bearer network 02 and the second carrier bearer network 03 can work simultaneously, the light source module 01 can transmit an optical carrier through the two carrier bearer networks simultaneously.

The group of first nodes 04 is connected to the group of second nodes 06 through the first service bearer network 05. Each first node 04 is configured to modulate, based on a service electrical signal, the optical carrier to obtain a service optical signal, and transmit the service optical signal to at least one of the second nodes 06 through the first service bearer network 05.

Each first node 04 includes a transmitter (TX) module. The TX module can modulate the service electrical signal to the optical carrier, to obtain the service optical signal. Each second node 06 includes a receiver (RX) module. The RX module can demodulate the received service optical signal, to restore the service electrical signal. The first node 04 may also be referred to as a signal transmission node, and the second node 06 may also be referred to as a signal receiving node.

It should be understood that the group of first nodes 04 refers to a plurality of first nodes 04, and a group of second nodes 06 refers to a plurality of second nodes 06. In addition, a quantity of first nodes 04 and a quantity of second nodes 06 that are included in the optical communication system may be the same or may be different. Each first node 04 can be connected to the at least one of the second nodes 06 through the first service bearer network 05, and transmit the service optical signal to at least one of the second nodes 06. For example, refer to FIG. 1. Each first node 04 may be connected to the group of second nodes 06, and transmit service optical signals to the group of second nodes 06.

Each carrier bearer network in the first carrier bearer network 02 and the second carrier bearer network 03 includes a plurality of optical waveguides. Each optical waveguide is configured to connect the light source module 01 to a first node 04. For example, assuming that the optical communication system includes N first nodes 04, and N is an integer greater than 1, both the first carrier bearer network 02 and the second carrier bearer network 03 may include N optical waveguides. Similarly, the first service bearer network 05 also includes a plurality of optical waveguides. Each optical waveguide is configured to connect a first node 04 to a second node 06.

Optionally, the optical waveguide may be an optical fiber. In addition, a plurality of optical fibers included in each of the first carrier bearer network 02, the second carrier bearer network 03, and the first service bearer network 05 may be routed in a clustering way, to facilitate maintenance of the bearer network. The optical fiber may be a quartz optical fiber, or may be an optical fiber made of another material such as a polymer. In this embodiment of this application, a material of the optical fiber in the bearer network is not limited, only to ensure that the optical fiber can transmit an optical signal.

In the optical communication system according to this embodiment of this application, because a light source module can provide an optical carrier for a plurality of first nodes, a quantity of light source modules that need to be disposed in the optical communication system can be effectively reduced, thereby reducing costs of the optical communication system, and facilitating maintenance and replacement of the light source modules. In addition, because the light source module can be connected to a group of first nodes separately through the two carrier bearer networks, even if either carrier bearer network is faulty, the other carrier bearer network can continue to transmit an optical carrier, thereby effectively improving reliability of optical carrier transmission, and further improving reliability of the optical communication system.

In addition, because the two carrier bearer networks are independent of each other and can work simultaneously, after either carrier bearer network is faulty, the first node can continue to generate a service optical signal based on an optical carrier transmitted by the other carrier bearer network, and transmit the service optical signal. In the foregoing process, there is no need to switch the carrier bearer network used for transmitting the optical carrier. In other words, no failover is needed. This can avoid interrupted transmission of the optical carrier caused by the failover, and further avoid interrupted transmission of a service optical signal. In this way, it can be ensured that when a fault occurs in either carrier bearer network, the first node and the second node still maintain a normal communication state.

The optical communication system according to this embodiment of this application may be used in a telecommunication network (for example, a passive optical access network), a vehicle, or an industrial optical network. If the optical communication system is used in the telecommunication network, a node in the optical communication system may be an optical line terminal (OLT), an optical network unit (ONU), or the like. If the optical communication system is used in the vehicle, a node in the optical communication system may be a vehicle interface unit (VIU) connected to a vehicle-mounted sensor, a vehicle-mounted actuator, or a vehicle-mounted controller. The VIU may also be referred to as a vehicle-mounted communication optical box. If the optical communication system is used in the industrial optical network, a node in the optical communication system may be an industrial interface unit connected to an industrial sensor, an industrial actuator, or an industrial controller. The industrial interface unit may also be referred to as an industrial communication optical box.

Figure 2:
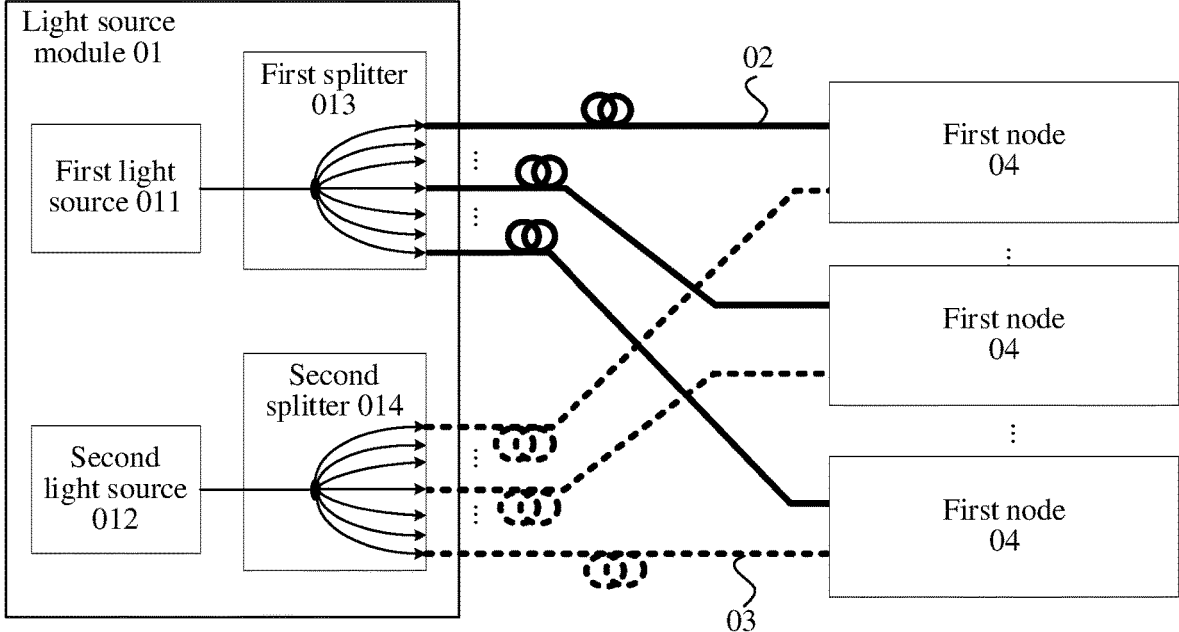
FIG. 2 is a schematic diagram of a partial structure of an optical communication system according to an embodiment of this application.

It may be understood that in application scenarios such as the vehicle and the industrial optical network, communication interruption between nodes causes a serious consequence, for example, may cause a self-driving vehicle to be out of control or an industrial actuator (for example, a mechanical arm) to be out of control. Therefore, the foregoing application scenarios have a high requirement on reliability of communication between nodes. Because a solution according to this embodiment of this application can effectively reduce a probability of communication interruption between nodes caused by a fault in a carrier bearer network, the solution may be applied to the foregoing application scenarios in which a high requirement on reliability of communication is needed. FIG. 2 is a schematic diagram of a partial structure of an optical communication system according to an embodiment of this application. As shown in FIG. 2, the light source module 01 may include a first light source 011 and a second light source 012 that provide backup for each other. That the first light source 011 and the second light source 012 provide backup for each other means that the two light sources are independent of each other and can work simultaneously.

The first light source 011 is connected to the group of first nodes 04 through the first carrier bearer network 02, and is configured to provide an optical carrier for the group of first nodes 04 through the first carrier bearer network 02. The second light source 012 is connected to the group of first nodes 04 through the second carrier bearer network 03, and is configured to provide an optical carrier for the group of first nodes 04 through the second carrier bearer network 03.

Because the light source is an active light emitting component with high power consumption, working performance of the light source is easily affected by an environment and fluctuates. Therefore, two light sources working in an active/standby mode are provided in the light source module, thereby effectively improving reliability of the light source module, and further improving reliability of the optical communication system. In addition, because the two light sources can work simultaneously, and are connected to the first node through different carrier bearer networks, after either light source is faulty, the other light source can further continue to provide an optical carrier for the first node. In the foregoing process, there is no need to switch a light source used for providing an optical carrier by using an optical transform switch. In other words, no failover is needed. This can avoid interrupted transmission of the optical carrier caused by the failover, and further avoid interrupted transmission of a service optical signal. In this way, it can be ensured that when either light source is faulty, the first node and the second node still maintain a normal communication state.

Optionally, both the first light source 011 and the second light source 012 may be single-wavelength light sources, wide-spectrum light sources, or multi-wavelength light sources. The single-wavelength light source can provide an optical carrier with a single wavelength. The wide-spectrum light source can provide an optical carrier of which band width is greater than a threshold. In other words, the optical carrier provided by the wide-spectrum light source has a wide band. The multi-wavelength light source can output a plurality of single-wavelength optical carriers in parallel.

The following describes the optical communication system according to this embodiment of this application by using an example in which both the first light source 011 and the second light source 012 are single-wavelength light sources. Wavelengths of optical carriers provided by the first light source 011 and the second light source 012 are different, to avoid interference between the optical carriers.

Refer to FIG. 2. The light source module 01 further includes a first splitter 013 and a second splitter 014. The first light source 011 is connected to the first carrier bearer network 02 through the first splitter 013. The first splitter 013 is configured to split an optical carrier provided by the first light source 011, and transmit a split optical carrier to each first node 04 separately through the first carrier bearer network 02. The second light source 012 is connected to the second carrier bearer network 03 through the second splitter 014. The second splitter 014 is configured to split an optical carrier provided by the second light source 012, and transmit a split optical carrier to each first node 04 separately through the second carrier bearer network 03.

Both the first splitter 013 and the second splitter 014 can evenly or unevenly split the received optical carrier based on optical power of the optical carrier needed by each first node 04. For example, assuming that the optical communication system includes N first nodes 04, and optical power of optical carriers needed by the N first nodes 04 are equal, both the first splitter 013 and the second splitter 014 can evenly split the received optical carriers into N optical carriers with equal optical power. The N optical carriers can be transmitted to the N first nodes 04 separately through a carrier bearer network.

The splitter is a passive component, costs of the splitter are low, and costs of a single-wavelength light source and a wide-spectrum light source are also low. Therefore, a combination of the single-wavelength light source and the splitter is used to provide an optical carrier for a plurality of first nodes, so that costs of the light source module can be effectively reduced.

Optionally, as shown in FIG. 1, the optical communication system may further include a second service bearer network 07. The second service bearer network 07 and the first service bearer network 05 provide backup for each other. That the second service bearer network 07 and the first service bearer network 05 provide backup for each other means that the two service bearer networks are independent of each other and can work simultaneously. In other words, the two service bearer networks provide hot backup for each other. The group of first nodes 04 is further connected to the group of second nodes 06 through the second service bearer network 07. Each first node 04 is further configured to transmit a service optical signal to at least one of the second nodes 06 through the second service bearer network 07.

Because the first node can be connected to the second node through the two service bearer networks that provide backup for each other, when either service bearer network is faulty, the first node can further continue to transmit the service optical signal through the other service bearer network. In addition, in the foregoing process, there is no need to switch the service bearer network used for transmitting the service optical signal. In other words, no failover is needed. This can avoid interrupted transmission of the service optical signal caused by the failover. In this way, it can be ensured that when a fault occurs in either service bearer network, the first node and the second node still maintain a normal communication state.

Figure 3:
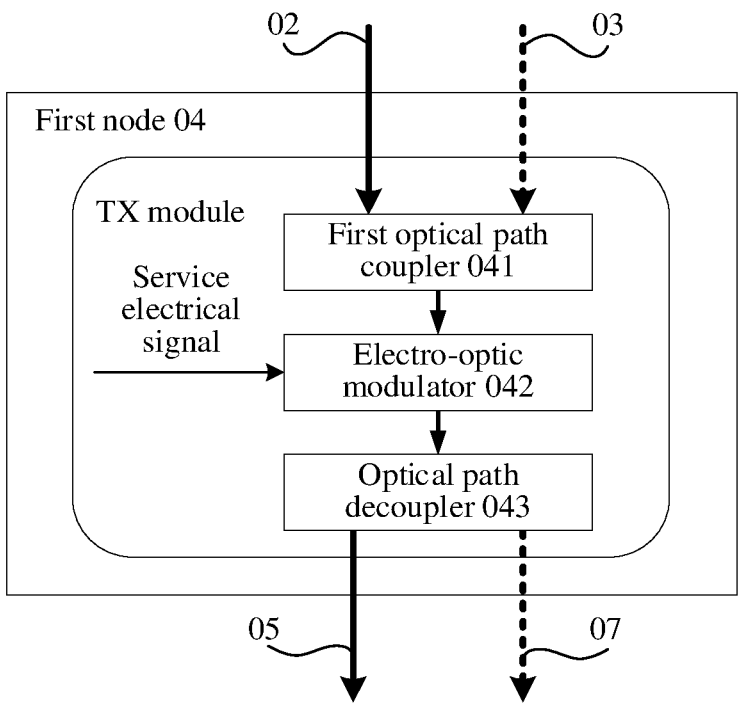
FIG. 3 is a schematic diagram of a structure of a first node according to an embodiment of this application.

For a scenario in which the optical communication system includes two service bearer networks that provide backup for each other, as an optional implementation, as shown in FIG. 3, a TX module in each first node 04 may include a first optical path coupler 041, an electro-optic modulator 042, and an optical path decoupler 043.

The first optical path coupler 041 is separately connected to the first carrier bearer network 02, the second carrier bearer network 03, and the electro-optic modulator 042. The first optical path coupler 041 is configured to couple an optical carrier transmitted by the first carrier bearer network 02 and an optical carrier transmitted by the second carrier bearer network 03, and transmit a coupled optical carrier to the electro-optic modulator 042.

The electro-optic modulator 042 is connected to the optical path decoupler 043. The electro-optic modulator 042 is configured to modulate, based on the service electrical signal, an optical carrier transmitted by the first optical path coupler 041, to obtain a service optical signal, and transmit the service optical signal to the optical path decoupler 043.

The optical path decoupler 043 is further separately connected to the first service bearer network 05 and the second service bearer network 07. The optical path decoupler 043 is configured to decouple the service optical signal, and transmit a decoupled service optical signal to at least one of the second nodes 06 through the first service bearer network 05 and the second service bearer network 07.

The first optical path coupler 041 is a multiplexer or an optical combiner, and the optical path decoupler 043 is a demultiplexer. A multiplexer is a component that can multiplex optical signals with different wavelengths. An optical combiner is a component that can superimpose optical power of a plurality of channels of optical signals (with same or different wavelengths or bands). A demultiplexer is a component that can demultiplex optical signals with different wavelengths.

In the implementation, because the first node 04 uses the first optical path coupler 041 to couple optical carriers transmitted by the two carrier bearer networks, and uses the optical path decoupler 043 to decouple the service optical signal, only one electro-optic modulator 042 needs to be disposed in the first node 04. In addition, because both the first optical path coupler 041 and the optical path decoupler 043 are passive components, and costs are low, the implementation can effectively reduce costs of the first node 04, and further reduce costs of the optical communication system.

As another optional implementation, the TX module in each first node 04 may include the first electro-optic modulator and the second electro-optic modulator that provide backup for each other. The first electro-optic modulator is separately connected to the first carrier bearer network 02 and the first service bearer network 05. The first electro-optic modulator is configured to modulate, based on the service electrical signal, an optical carrier transmitted by the first carrier bearer network 02, to obtain a service optical signal, and transmit the service optical signal to at least one of the second nodes 06 through the first service bearer network 05. The second electro-optic modulator 042 is separately connected to the second carrier bearer network 03 and the second service bearer network 07. The second electro-optic modulator 042 is configured to modulate, based on the service electrical signal, an optical carrier transmitted by the second carrier bearer network 03, to obtain a service optical signal, and transmit the service optical signal to at least one of the second nodes 06 through the second service bearer network 07.

In the implementation, because the first node uses two electro-optic modulators to separately modulate the optical carriers transmitted by the two carrier bearer networks, when either electro-optic modulator is faulty, the other electro-optic modulator can further continue to transmit the service optical signal to the second node. In this way, reliability of the first node 04 during working is effectively improved, and reliability of the optical communication system is further improved. In addition, because ideal working points when the electro-optic modulator modulates optical carriers with different wavelengths are different, it can be ensured that each electro-optic modulator can work near an ideal working point of the electro-optic modulator by using two electro-optic modulators, to modulate an optical carrier with a wavelength, thereby ensuring high modulation performance of the electro-optic modulator.

Figure 4:
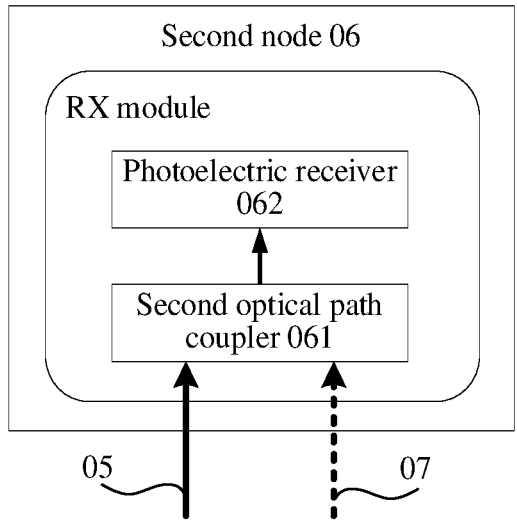
FIG. 4 is a schematic diagram of a structure of a second node according to an embodiment of this application.

For a scenario in which the optical communication system includes two service bearer networks that provide backup for each other, as an optional implementation, as shown in FIG. 4, the RX module in each second node 06 may include a second optical path coupler 061 and a photoelectric receiver 062.

The second optical path coupler 061 is separately connected to the first service bearer network 05, the second service bearer network 07, and the photoelectric receiver 062. The second optical path coupler 061 is configured to couple a service optical signal transmitted by the first service bearer network 05 and a service optical signal transmitted by the second service bearer network 07, and transmit a coupled service optical signal to the photoelectric receiver 062. The photoelectric receiver 062 is configured to demodulate the service optical signal transmitted by the second optical path coupler 061. The second optical path coupler 061 may be a multiplexer or an optical combiner.

In this implementation, because the second node uses the second optical path coupler to couple service optical signals transmitted by the two service bearer networks, only one photoelectric receiver needs to be disposed in the second node. In this way, costs of the second node are effectively reduced, and costs of the optical communication system are further reduced. In addition, because the second optical path coupler is a passive component, and costs are low, the implementation can effectively reduce costs of the second node, and further reduce costs of the optical communication system.

As another optional implementation, the RX module in each second node 06 may include a first photoelectric receiver and a second photoelectric receiver that provide backup for each other. The first photoelectric receiver is connected to the first service bearer network 05. The first photoelectric receiver is configured to demodulate a first service optical signal transmitted by the first service bearer network 05. The second photoelectric receiver is connected to the second service bearer network 07. The second photoelectric receiver is configured to demodulate a second service optical signal transmitted by the second service bearer network 07.

In the implementation, because the second node uses two photoelectric receivers to separately demodulate service optical signals transmitted by the two service bearer networks, when either photoelectric receiver is faulty, the other photoelectric receiver can further continue to receive and demodulate the service optical signals. In this way, reliability of the second node is effectively improved, and reliability of the optical communication system is further improved. In addition, because ideal working points when the photoelectric receiver demodulates service optical signals with different wavelengths are different, it can be ensured that each photoelectric receiver can work near an ideal working point of the photoelectric receiver by using two photoelectric receivers, to modulate a service optical signal with a wavelength, thereby ensuring high demodulation performance of the photoelectric receiver.

It may be understood that if the optical communication system does not include the second service bearer network 07, the second optical path coupler 061 does not need to be disposed in each second node 06, and two photoelectric receivers that provide backup for each other do not need to be disposed. In other words, only one photoelectric receiver may be disposed in the second node 06.

For a scenario in which the optical communication system does not include the second service bearer network 07, as a possible example, the TX module in each first node 04 may include the first optical path coupler 041 and the electro-optic modulator 042. The electro-optic modulator 042 is directly connected to the first service bearer network 05, and is configured to modulate, based on the service electrical signal, an optical carrier transmitted by the first optical path coupler 041, to obtain a service optical signal, and transmit the service optical signal to at least one of the second nodes 06 through the first service bearer network 05. In other words, the optical path decoupler 043 does not need to be disposed in the first node 04.

As another possible example, the TX module in each first node 04 may include the first electro-optic modulator, the second electro-optic modulator, and a third optical path coupler. The third optical path coupler is separately connected to the two electro-optic modulators and the first service bearer network 05, and is configured to couple service optical signals generated by the two electro-optic modulators, and transmit a coupled service optical signal to at least one of the second nodes 06 through the first service bearer network 05. The third optical path coupler may be a multiplexer or an optical combiner.

The foregoing is described by using an example in which the first node 04 is a signal transmission node and the second node 06 is a signal receiving node. It should be understood that the TX module such as that shown in FIG. 3 may be disposed in the second node 06, and the RX module such as that shown in FIG. 4 may be disposed in the first node 04. Correspondingly, the second node 06 may also serve as a signal transmission node to transmit a service optical signal to the first node 04, and the first node 04 may also serve as a signal receiving node to receive and demodulate a service optical signal. In addition, a light source module that provides an optical carrier for the second node 06 may be the light source module 01, or may be another light source module independent of the light source module 01.

Figure 5:
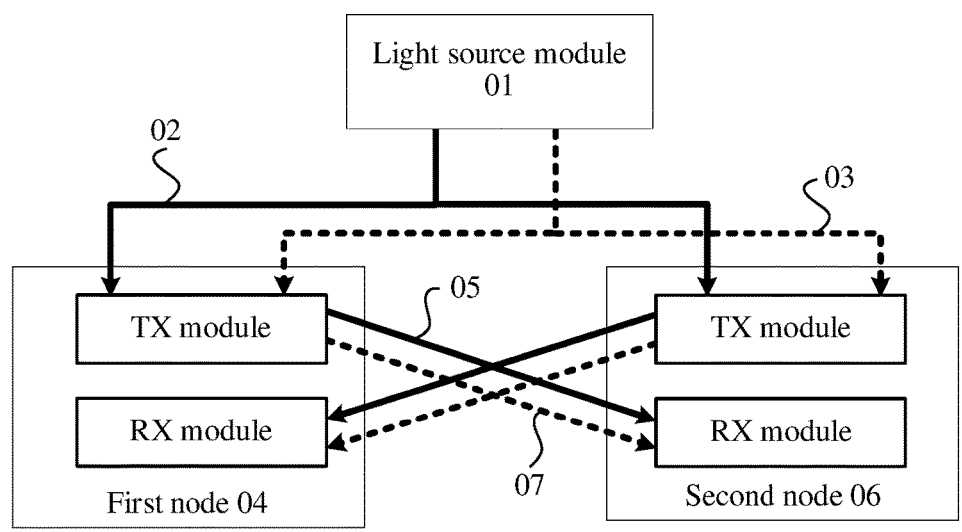
FIG. 5 is a schematic diagram of a structure of another optical communication system according to an embodiment of this application.

For example, as shown in FIG. 5, the light source module 01 can further provide an optical carrier for the TX module in the second node 06 separately through the first carrier bearer network 02 and the second carrier bearer network 03. The TX module of the second node 06 can further transmit a service optical signal to the RX module of the first node 04 separately through the first service bearer network 05 and the second service bearer network 07.

Figure 6:
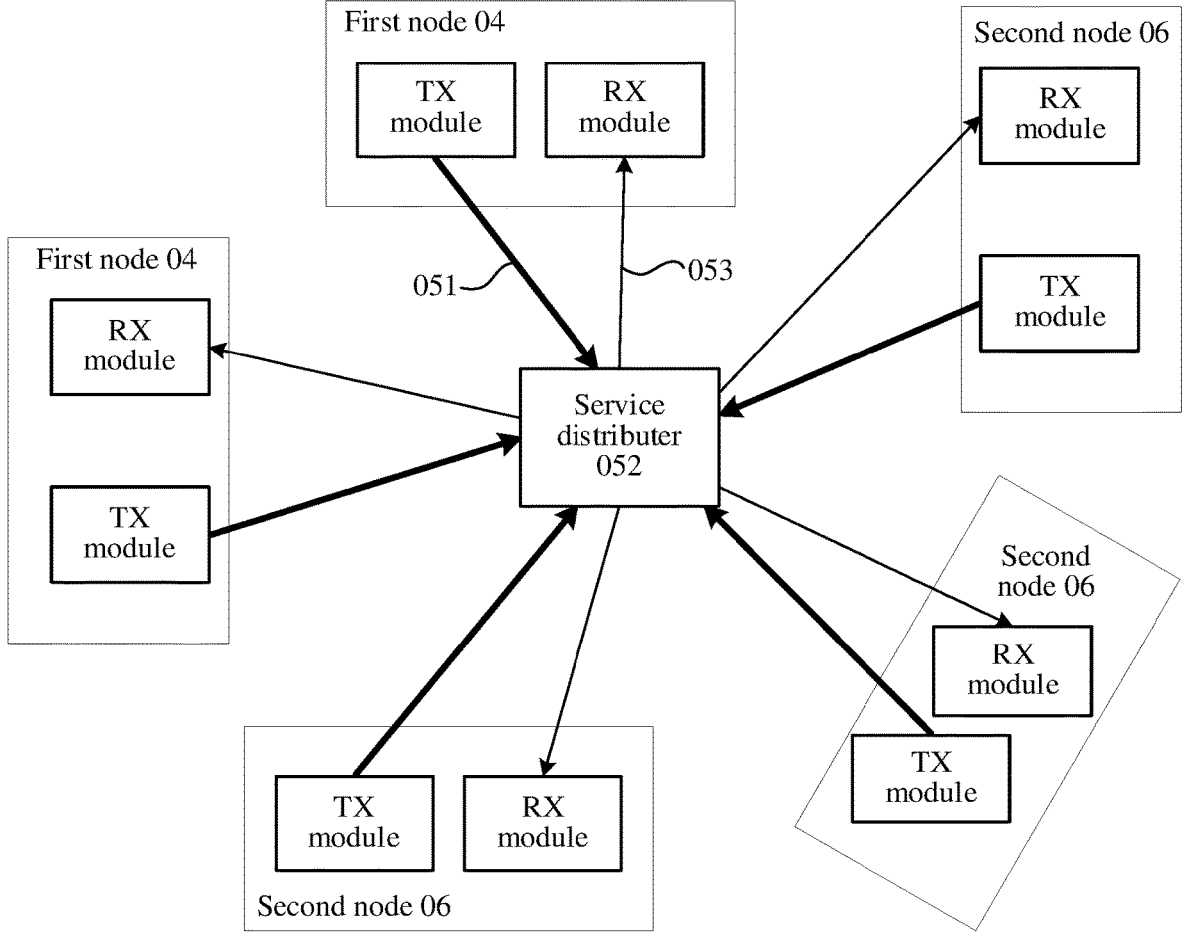
FIG. 6 is a schematic diagram of a structure of a first service bearer network according to an embodiment of this application.

Optionally, as shown in FIG. 6, the first service bearer network 05 may be a star network. The star network can implement communication between any two nodes in the group of first nodes 04 and the group of second nodes 06. Correspondingly, refer to FIG. 6. Each node in the optical communication system may include the TX module and the RX module. In other words, each node has a signal transmission function and a signal receiving function.

The star network can implement multipoint-to-multipoint (MP2MP) communication, thereby effectively improving flexibility and efficiency of communication between nodes. In addition, a fault of a single node in the star network does not affect normal communication between other nodes, and reliability of communication between nodes in the star network is high.

Still refer to FIG. 6. The first service bearer network 05 may include a first optical waveguide 051, a service distributer 052, and a second optical waveguide 053. Both the first optical waveguide 051 and the second optical waveguide 053 are separately connected to the group of first nodes 04, the group of second nodes 06, and the service distributer 052. The first optical waveguide 051 is separately connected to the TX module in each node, and the second optical waveguide 053 is separately connected to the RX module in each node. The service distributer 052 is configured to receive a service optical signal from at least one node of the group of first nodes 04 and the group of second nodes 06 through the first optical waveguide 051, couple the received service optical signal, split a coupled service optical signal, and transmit a split service optical signal to the group of first nodes 04 and the group of second nodes 06 separately through the second optical waveguide 053.

Figure 7:
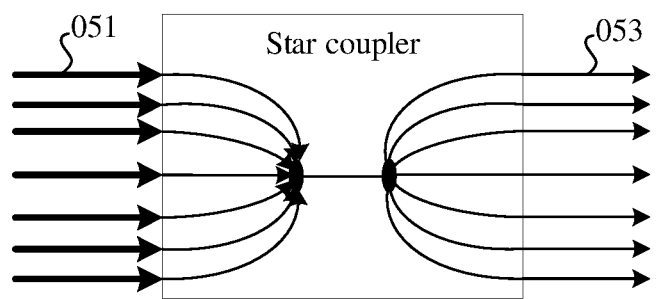
FIG. 7 is a schematic diagram of a structure of a star coupler according to an embodiment of this application.

Optionally, the service distributer 052 may be a star coupler. As shown in FIG. 7, an input end of the star coupler is connected to the first optical waveguide 051, and an output end is connected to the second optical waveguide 053. The star coupler can combine at least one channel of service optical signal received by the input end of the star coupler (in other words, superimpose power of at least one channel of service optical signals), evenly or unevenly split a combined service optical signal, and transmit a split service optical signal to each node through the second optical waveguide 053. In other words, the service distributer 052 can send the service optical signal by broadcasting.

For example, assuming that the optical communication system includes M (M is an integer greater than 1) nodes in total, the star coupler can combine the received M channels of service optical signals, then evenly divide a combined service optical signal into M channels of service optical signals with equal power, and transmit the M channels of service optical signals to the M nodes through the second optical waveguide 053.

To ensure that a node that receives the service optical signal can identify a node from which the service optical signal comes, a node that transmits the service optical signal may generate a service optical signal by using a technology such as code division multiple access (CDMA) or frequency division multiple access (FDMA). The node that receives the service optical signal may identify a transmitter node of the service optical signal based on a code word or a frequency of a subcarrier in the service optical signal, to determine whether the service optical signal needs to be demodulated. For example, if a node identifies that a service optical signal received by the node is a service optical signal transmitted by the node, the service optical signal is not needed to be demodulated.

It may be understood that a topology type of the first service bearer network 05 may be a star topology, or may be another topology type. For example, the topology type of the first service bearer network 05 may also be a ring.

It may be further understood that if the optical communication system further includes the second service bearer network 07, a structure of the second service bearer network 07 is the same as that of the first service bearer network 05. For example, assuming that the two service bearer networks are both star networks, the TX module of each node in the optical communication system may be separately connected to first optical waveguides 051 in the two service bearer networks, and the RX module in each node may be separately connected to second optical waveguides 053 in the two service bearer networks. The following describes the optical communication system according to this embodiment of this application by using an example in which both the first light source 011 and the second light source 012 are wide-spectrum light sources. The wide-spectrum light source may be a light-emitting diode (LED), a superluminescent diode (SLD), or the like. Because the wide-spectrum light source is not a coherent light source, bands of optical carriers provided by the first light source 011 and the second light source 012 may be the same or may be different.

Refer to FIG. 2. The light source module 01 further includes the first splitter 013 and the second splitter 014. For connections and working principles of the first splitter 013 and the second splitter 014, refer to related descriptions in the foregoing single-wavelength light source embodiment. Details are not described herein again.

Optionally, as shown in FIG. 1 and FIG. 2, the optical communication system according to this embodiment of this application may further include the second service bearer network 07 that provides backup for each other with the first service bearer network 05. For a connection and a working principle of the second service bearer network 07, refer to related descriptions in the foregoing single-wavelength light source embodiment. Details are not described herein again.

For a scenario in which the optical communication system includes two service bearer networks that provide backup for each other, as an optional implementation, as shown in FIG. 3, the TX module in each first node 04 may include the first optical path coupler 041, the electro-optic modulator 042, and the optical path decoupler 043. For connections and working principles of the first optical path coupler 041, the electro-optic modulator 042, and the optical path decoupler 043, refer to related descriptions in the foregoing single-wavelength light source embodiment. Details are not described herein again.

It should be understood that if bands of optical carriers provided by the first light source 011 and the second light source 012 are different, the first optical path coupler 041 is a multiplexer or an optical combiner, and the optical path decoupler 043 is a demultiplexer. If the bands of the optical carriers provided by the first light source 011 and the second light source 012 are the same, the first optical path coupler 041 is an optical combiner, and the optical path decoupler 043 is a splitter.

As another optional implementation, the TX module in each first node 04 may include the first electro-optic modulator and the second electro-optic modulator that provide backup for each other. For connections and working principles of the two electro-optic modulators, refer to related descriptions in the foregoing single-wavelength light source embodiment. Details are not described herein again.

For a scenario in which the optical communication system includes two service bearer networks that provide backup for each other, as an optional implementation, as shown in FIG. 4, the RX module in each second node 06 may include the second optical path coupler 061 and the photoelectric receiver 062. For connections and working principles of the second optical path coupler 061 and the photoelectric receiver 062, refer to related descriptions in the foregoing single-wavelength light source embodiment. Details are not described herein again.

It should be understood that if bands of optical carriers provided by the first light source 011 and the second light source 012 are different, the second optical path coupler 061 is a multiplexer or an optical combiner. If the bands of the optical carriers provided by the first light source 011 and the second light source 012 are the same, the second optical path coupler 061 is an optical combiner.

As another optional implementation, the RX module in each second node 06 may include the first photoelectric receiver and the second photoelectric receiver that provide backup for each other. For connections and working principles of the two photoelectric receivers, refer to related descriptions in the foregoing single-wavelength light source embodiment. Details are not described herein again.

Optionally, as shown in FIG. 6, the first service bearer network 05 may be a star network. The star network includes the first optical waveguide 051, the service distributer 052, and the second optical waveguide 053. The service distributer 052 may be a star coupler. For structures and working principles of the first optical waveguide 051, the service distributer 052, and the second optical waveguide 053, refer to related descriptions in the foregoing single-wavelength light source embodiment. Details are not described herein again. The following describes the optical communication system according to this embodiment of this application by using an example in which both the first light source 011 and the second light source 012 are multi-wavelength light sources.

The first light source 011 in the light source module 01 is directly connected to the first carrier bearer network 02, and can output a plurality of single-wavelength optical carriers in parallel to the first carrier bearer network 02. The first carrier bearer network 02 can transmit an optical carrier with a wavelength to each first node 04. The second light source 012 is directly connected to the second carrier bearer network 03, and can output a plurality of single-wavelength optical carriers to the second carrier bearer network 03 in parallel. The second carrier bearer network 03 can transmit an optical carrier with a wavelength to each first node 04. Wavelengths of optical carriers transmitted by the first carrier bearer network 02 and the second carrier bearer network 03 to a same first node 04 are different, to avoid interference between the optical carriers.

Because the multi-wavelength light source can output a plurality of single-wavelength optical carriers in parallel, and an optical carrier of each wavelength can be transmitted to one first node without splitting, it can be ensured that power of the optical carrier received by the first node is high, thereby ensuring that transmission performance of a service optical signal obtained by modulating the optical carrier is better.

Optionally, as shown in FIG. 1 and FIG. 2, the optical communication system may further include the second service bearer network 07 that provides backup for each other with the first service bearer network 05. For a connection and a working principle of the second service bearer network 07, refer to related descriptions in the foregoing single-wavelength light source embodiment. Details are not described herein again.

For a scenario in which the optical communication system includes two service bearer networks that provide backup for each other, a structure and a working principle of the TX module in the first node 04 and a structure and a working principle of the RX module in the second node 06, refer to related descriptions in the foregoing single-wavelength light source embodiment. Details are not described herein again.

Optionally, as shown in FIG. 6, the first service bearer network 05 may be a star network. The star network may include the first optical waveguide 051, the service distributer 052, and the second optical waveguide 053. For connections of the first optical waveguide 051, the service distributer 052, and the second optical waveguide 053, refer to related descriptions in the foregoing single-wavelength light source embodiment. Details are not described herein again.

Figure 8:
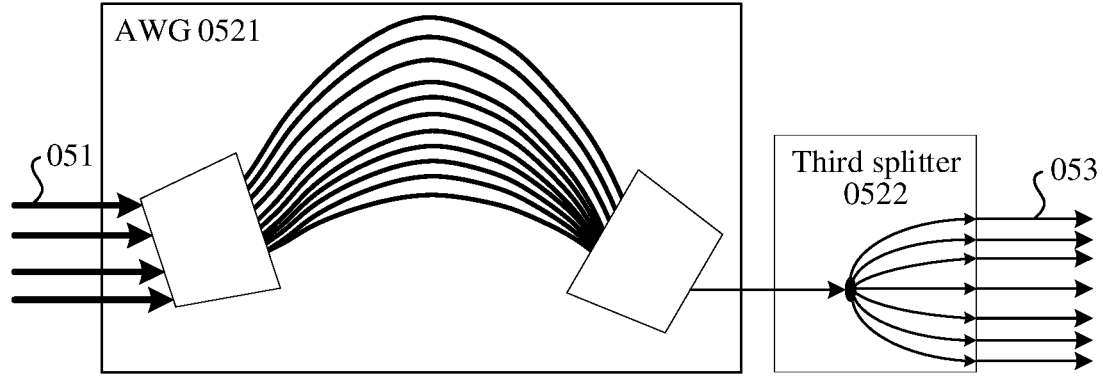
FIG. 8 is a schematic diagram of a structure of a service distributer according to an embodiment of this application.

Refer to FIG. 8. The service distributer 052 may include an AWG 0521 and a third splitter 0522. Two ends of the AWG 0521 are respectively connected to the first optical waveguide 051 and an input end of the third splitter 0522. An output end of the third splitter 0522 is connected to the second optical waveguide 053. The AWG 0521 is configured to multiplex a received service optical signal, and transmit a multiplexed service optical signal to the third splitter 0522. The third splitter 0522 is configured to split the multiplexed service optical signal, and transmit a split service optical signal to the group of first nodes 04 and the group of second nodes 06 separately through the second optical waveguide 053.

Optionally, for a scenario in which both the first light source 011 and the second light source 012 are multi-wavelength light sources, the service distributer 052 may also be a star coupler. For a working principle of the star coupler, refer to related descriptions in the foregoing single-wavelength light source embodiment. Details are not described herein again.

In conclusion, this embodiment of this application provides an optical communication system. A light source module in the optical communication system can be connected to a group of first nodes separately through two carrier bearer networks. Therefore, even if either carrier bearer network is faulty, the other carrier bearer network can continue to transmit an optical carrier, thereby effectively improving reliability of optical carrier transmission, and further improving reliability of the optical communication system. In addition, because the two carrier bearer networks are independent of each other and can work simultaneously, after either carrier bearer network is faulty, no failover is needed. This can avoid interrupted transmission of the optical carrier caused by the failover, and further avoid interrupted transmission of a service optical signal.

In addition, in the optical communication system according to this embodiment of this application, the light source module may include two light sources that provide backup for each other, and there may be another service bearer network for backup. In this way, end-to-end backup of the optical communication system is implemented, and reliability of the optical communication system is further improved, so that the optical communication system can be used in a scenario in which high communication reliability is needed.

This embodiment of this application further provides another optical communication system. The optical communication system includes a light source module 01, a first carrier bearer network 02, a group of first nodes 04, a first service bearer network 05, a second service bearer network 07, and a group of second nodes 06. The first service bearer network 05 and the second service bearer network 07 provide backup for each other.

The light source module 01 is connected to the group of first nodes 04 through the first carrier bearer network 02, and the light source module 01 is configured to transmit an optical carrier to the group of first nodes 04 separately through the first carrier bearer network 02. The group of first nodes 04 are connected to the group of second nodes 06 separately through the first service bearer network 05 and the second service bearer network 07. Each first node 04 is configured to modulate an optical carrier based on a service electrical signal to obtain a service optical signal, and transmit the service optical signal to at least one of the second nodes 06 separately through the first service bearer network 05 and the second service bearer network 07.

It should be understood that for a structure and a working principle of the light source module 01 in the optical communication system, a structure and a working principle of the first node 04, a structure and a working principle of the second node 06, and a structure and a working principle of each service bearer network, refer to related descriptions in the foregoing embodiment. Details are not described herein again.

Figure 9:
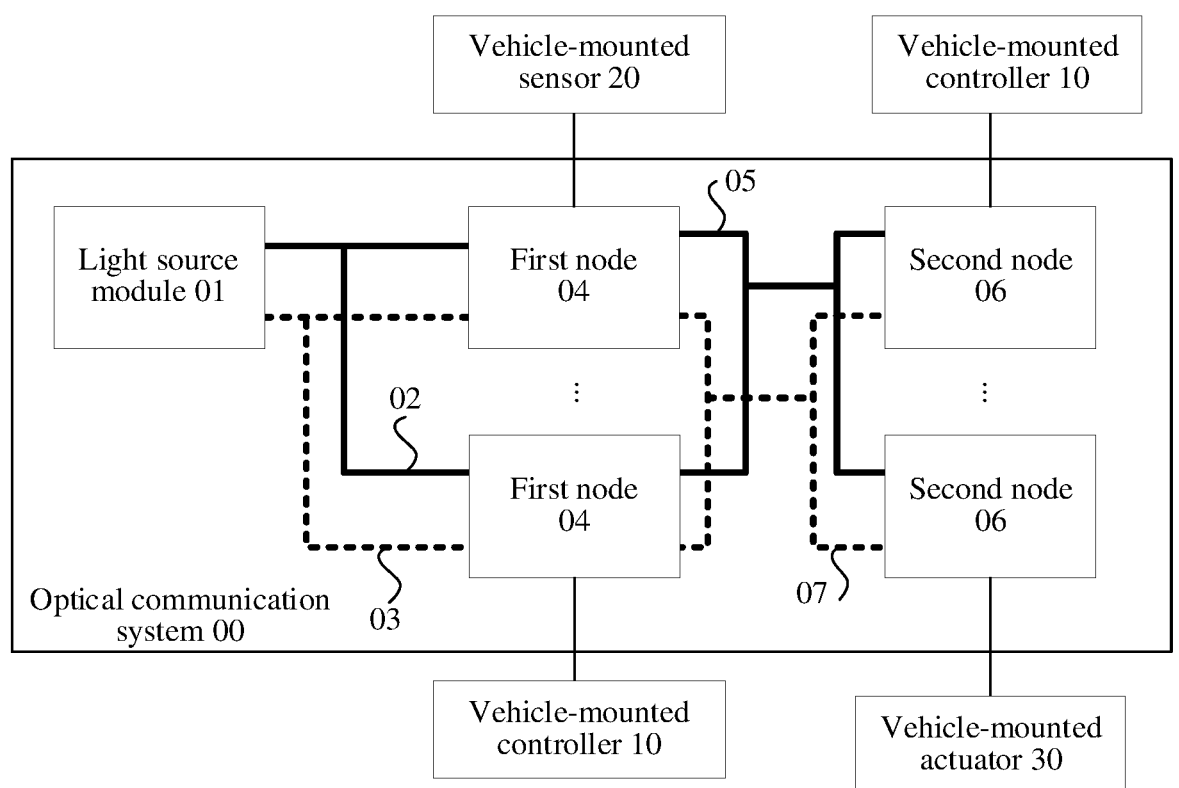
FIG. 9 is a schematic diagram of a structure of a vehicle according to an embodiment of this application.

Because the first node can transmit the service optical signal to the second node separately through the two service bearer networks, even if either service bearer network is faulty, the other service bearer network can continue to transmit a service optical signal, thereby effectively improving reliability of service optical signal transmission, and further improving reliability of the optical communication system. In addition, because the two service bearer networks are independent of each other and can work simultaneously, after either service bearer network is faulty, no failover is needed. This can avoid interrupted transmission of the service optical signal caused by the failover. This embodiment of this application further provides a vehicle. The vehicle may be an intelligent vehicle having a self-driving function. As shown in FIG. 9, the vehicle includes a vehicle-mounted controller 10, a vehicle-mounted sensor 20, a vehicle-mounted actuator 30, and the optical communication system 00 according to the foregoing embodiment. For a structure of the optical communication system 00, refer to FIG. 1 to FIG. 6. In addition, two light sources included in the light source module 01 in the optical communication system may be disposed at different positions of the vehicle, to reduce a probability that the two light sources are faulty simultaneously, and improve reliability of the light source module 01.

The vehicle-mounted sensor 20 is connected to a first node 04 in the optical communication system 00, and is configured to provide a service electrical signal for the first node 04. The vehicle-mounted controller 10 is connected to a second node 06 in the optical communication system 00, and is configured to receive a service electrical signal transmitted by the second node 06. In other words, the optical communication system 00 can implement signal interactions between the vehicle-mounted controller 10 and the vehicle-mounted sensor 20. Alternatively, the vehicle-mounted controller 10 is connected to a first node 04 in the optical communication system 00, and is configured to provide a service electrical signal for the first node 04. The vehicle-mounted actuator 30 is connected to a second node 06 in the optical communication system 00, and is configured to receive a service electrical signal transmitted by the second node 06. In other words, the optical communication system 00 can implement signal interactions between the vehicle-mounted controller 10 and the vehicle-mounted actuator 30.

For example, the optical communication system 00 can transmit data collected by the vehicle-mounted sensor 20 as a service electrical signal to the vehicle-mounted controller 10. The vehicle-mounted controller 10 can analyze and process the data collected by the vehicle-mounted sensor 20, and transmit an instruction or data to the vehicle-mounted actuator 30 through the optical communication system 00.

It may be understood that each node in the optical communication system 00 and a vehicle-mounted component (such as a vehicle-mounted controller, a vehicle-mounted sensor, or a vehicle-mounted actuator) connected to the node may be independently disposed, or may be integrally disposed. For example, the first node 04 may be integrated into the vehicle-mounted controller 10 or the vehicle-mounted sensor 20, and the second node 06 may be integrated into the vehicle-mounted controller 10 or the vehicle-mounted actuator 30.

It may be further understood that as shown in FIG. 9, the vehicle may include a plurality of vehicle-mounted sensors 20, a plurality of vehicle-mounted actuators 30, and a plurality of vehicle-mounted controllers 10. Each vehicle-mounted sensor 20, each vehicle-mounted actuator 30, and each vehicle-mounted controller 10 can be connected to a node in the optical communication system 00, and can communicate, through the optical communication system 00, with a component connected to another node. For example, each node in the optical communication system 00 has a signal transmission function and a signal receiving function. Correspondingly, the vehicle-mounted controller 10 can further send a signal to the vehicle-mounted sensor 20 through the optical communication system 00, and can receive, through the optical communication system 00, a signal sent by the vehicle-mounted actuator 30.

Figure 10:
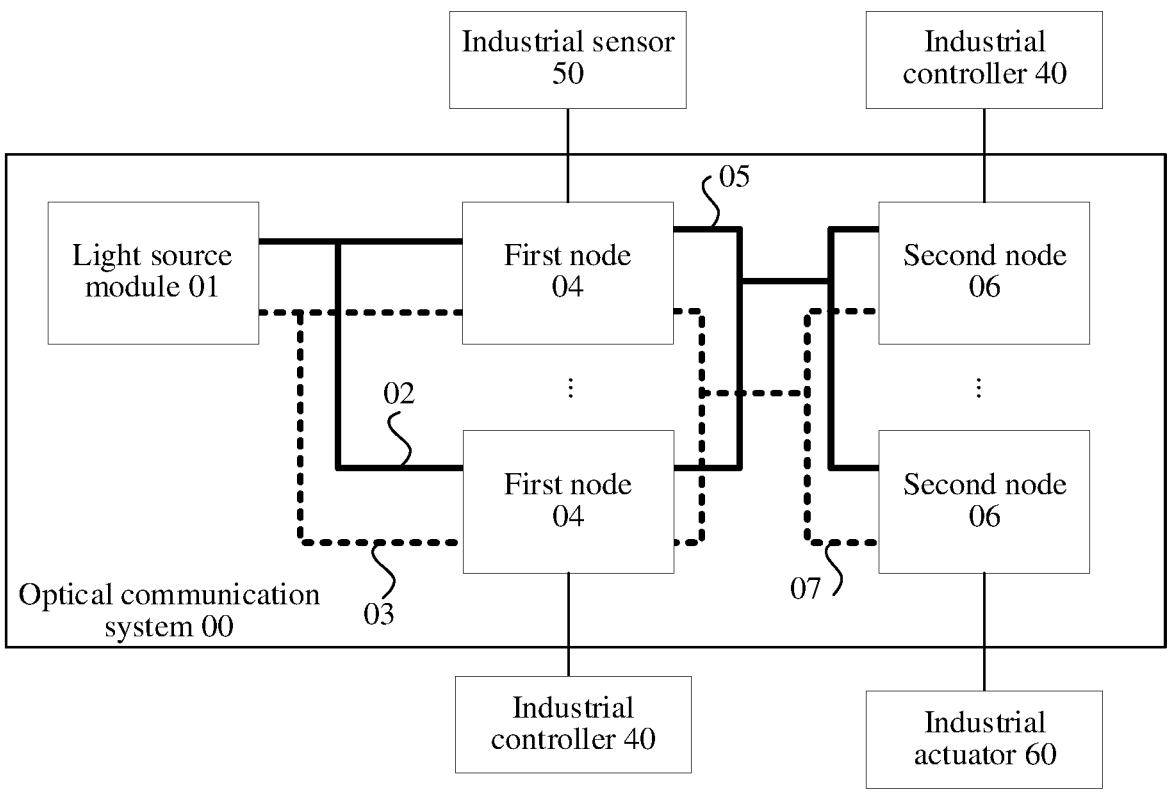
FIG. 10 is a schematic diagram of a structure of an industrial optical network according to an embodiment of this application.

Optionally, the plurality of vehicle-mounted sensors 20 may include a camera, a millimeter-wave radar, a lidar, and the like. The plurality of vehicle-mounted actuators 30 may include a pedal controller, a vehicle-mounted display, a vehicle-mounted air conditioner, a light controller, and the like. The vehicle-mounted display may include a central control display, a head-up display (HUD), and the like of a vehicle. This embodiment of this application further provides an industrial optical network. As shown in FIG. 10, the industrial optical network includes an industrial controller 40, an industrial sensor 50, an industrial actuator 60, and the optical communication system 00 according to the foregoing embodiment. For a structure of the optical communication system 00, refer to FIG. 1 to FIG. 6. In addition, the two light sources included in the light source module 01 in the optical communication system may be disposed at different positions in the industrial optical network, to reduce a probability that the two light sources are faulty simultaneously, and improve reliability of the light source module 01.

The industrial sensor 50 is connected to a first node 04 in the optical communication system 00, and is configured to provide a service electrical signal for the first node 04. The industrial controller 40 is connected to a second node 06 in the optical communication system 00, and is configured to receive a service electrical signal transmitted by the second node 06. In other words, the optical communication system 00 can implement signal interactions between the industrial controller 40 and the industrial sensor 50. Alternatively, the industrial controller 40 is connected to a first node 04 in the optical communication system 00, and is configured to provide a service electrical signal for the first node 04. The industrial actuator 60 is connected to a second node 06 in the optical communication system 00, and is configured to receive a service electrical signal transmitted by the second node 06. In other words, the optical communication system 00 can implement signal interactions between the industrial controller 40 and the industrial actuator 60.

For example, the optical communication system 00 can transmit data collected by the industrial sensor 50 as a service electrical signal to the industrial controller 40. The industrial controller 40 can analyze and process the data collected by the industrial sensor 50, and transmit an instruction or data to the industrial actuator 60 through the optical communication system 00.

It may be understood that each node in the optical communication system 00 and an industrial component (such as an industrial controller, an industrial sensor, or an industrial actuator) connected to the node may be independently disposed, or may be integrally disposed. For example, the first node 04 may be integrated into the industrial controller 40 or the industrial sensor 50, and the second node 06 may be integrated into the industrial controller 40 or the industrial actuator 60.

It may be further understood that the industrial optical network may include a plurality of industrial sensors 50, a plurality of industrial actuators 60, and a plurality of industrial controllers 40. Each industrial sensor 50, each industrial actuator 60, and each industrial controller 40 can be connected to a node in the optical communication system 00, and can communicate, through the optical communication system 00, with a component connected to another node. For example, each node in the optical communication system 00 has a signal transmission function and a signal receiving function. Correspondingly, the industrial controller 40 can further send a signal to the industrial sensor 50 through the optical communication system 00, and can receive, through the optical communication system, a signal sent by the industrial actuator 60.

Optionally, the industrial optical network may be a security monitoring network in industrial scenarios in which a high security is needed, such as a mining industry or a coal mining industry. Alternatively, the industrial optical network may be a goods scheduling network in industrial scenarios such as logistics or a port. Alternatively, the industrial optical network may be an automatic operation network in manufacturing industries such as a vehicle or a mobile terminal, for example, a network for automatic product assembly or sorting. The plurality of industrial sensors 50 may include a camera, a temperature and humidity sensor, a gas sensor, and the like. The plurality of industrial actuators 60 may include a mechanical arm, an industrial display, a temperature and humidity controller, and the like.

It may be further understood that because the optical communication system has characteristics of a high data transmission rate and a large data transmission amount, the optical communication system may be configured to transmit data with a large amount of data in a vehicle or an industrial optical network, that is, high-traffic data. For example, the optical communication system may be configured to transmit data collected by a camera or a radar, or may be configured to transmit image data to a display.

Because the carrier bearer network, the service bearer network, and the splitter in the optical communication system are all passive components, and the passive components have characteristics of no power consumption, no heat dissipation, strong environment adaptability, high working reliability, and the like, the passive components generally do not need to be backed up in the telecommunication network. However, in a vehicle and an industrial optical network, each component in an optical communication system needs to work in a harsh environment in which long-term vibration, a large temperature change range, and a mechanical collision may occur. Therefore, a higher requirement is put forward on reliability of each component in the optical communication system.

In the optical communication system according to this embodiment of this application, two carrier bearer networks working in an active/standby mode are used, and there may be another light source and another service bearer network for backup. Therefore, reliability of the entire optical communication system is effectively improved. When a component in the optical communication system is abnormal, another backup component can still continue to run, so that communication interruption between nodes can be avoided. In other words, a component (for example, a vehicle-mounted processor or a vehicle-mounted sensor) connected to a node is unaware of a fault. It can be learned from the foregoing analysis that the optical communication system according to this embodiment of this application can meet reliability requirements of a vehicle and an industrial optical network.

For example, assuming that a fiber cut or a light source failure occurs in a bearer network in a vehicle due to an accident collision, because a backup component can maintain a normal running status, communication interruption between vehicle-mounted components can be avoided, thereby ensuring that the vehicle maintains a normal running status.

Optionally, in a vehicle and an industrial optical network, a distance between a controller, a sensor, and an executor is usually small. Therefore, a service bearer network in the optical communication system may be a star network, to ensure flexibility and reliability of communication between components.

It should be understood that in addition to the vehicle and the industrial optical network, the optical communication system provided according to this embodiment of this application can be further used in another scenario in which high communication reliability is needed, for example, may be further used in fields such as aerospace and finance.

The term "at least one" in this application means one or more, and the term "a plurality of" in this application means two or more. For example, a plurality of nodes means two or more nodes.

The foregoing descriptions are merely optional implementations of this application, but the protection scope of this application is not limited thereto. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. An optical communication system, wherein the optical communication system comprises a light source, a first carrier bearer network, a second carrier bearer network, a group of first nodes, a first service bearer network, and a group of second nodes, wherein the first carrier bearer network and the second carrier bearer network provide backup for each other;

the light source is connected to the group of first nodes separately through the first carrier bearer network and the second carrier bearer network, and the light source is configured to transmit an optical carrier to the group of first nodes separately through the first carrier bearer network and the second carrier bearer network; and the group of first nodes is connected to the group of second nodes through the first service bearer network, and each first node is configured to modulate the optical carrier based on a service electrical signal to obtain a service optical signal, and transmit the service optical signal to at least one of the group of second nodes through the first service bearer network, wherein the light source comprises a first light source and a second light source that provide backup for each other, and the first light source is connected to the group of first nodes through the first carrier bearer network; and the second light source is connected to the group of first nodes through the second carrier bearer network.

2. The optical communication system according to claim 1, wherein both the first light source and the second light source are single-wavelength light sources or wide-spectrum light sources, and the light source further comprises a first splitter and a second splitter, and the first light source is connected to the first carrier bearer network through the first splitter, and the first splitter is configured to split an optical carrier provided by the first light source, and transmit a split optical carrier to each first node separately through the first carrier bearer network; and the second light source is connected to the second carrier bearer network through the second splitter, and the second splitter is configured to split an optical carrier provided by the second light source, and transmit a split optical carrier to each first node separately through the second carrier bearer network.

3. The optical communication system according to claim 1, wherein both the first light source and the second light source are multi-wavelength light sources;

the first light source is configured to output a plurality of single-wavelength optical carriers in parallel to the first carrier bearer network; and the second light source is configured to output a plurality of single-wavelength optical carriers in parallel to the second carrier bearer network.

4. The optical communication system according to claim 1, wherein each first node comprises a first optical path coupler and an electro-optic modulator, and the first optical path coupler is separately connected to the first carrier bearer network, the second carrier bearer network, and the electro-optic modulator, and the first optical path coupler is configured to couple an optical carrier transmitted by the first carrier bearer network and an optical carrier transmitted by the second carrier bearer network, and transmit a coupled optical carrier to the electro-optic modulator; and the electro-optic modulator is connected to the first service bearer network, and the electro-optic modulator is configured to modulate, based on the service electrical signal, an optical carrier transmitted by the first optical path coupler, to obtain the service optical signal, and transmit the service optical signal to at least one of the group of second nodes through the first service bearer network.

5. The optical communication system according to claim 1, wherein the optical communication system further comprises a second service bearer network, and the second service bearer network and the first service bearer network provide backup for each other; and the group of first nodes is further connected to the group of second nodes through the second service bearer network, and each first node is further configured to transmit the service optical signal to at least one of the group of second nodes through the second service bearer network.

6. The optical communication system according to claim 5, wherein each first node comprises a first optical path coupler, an electro-optic modulator, and an optical path decoupler, and the first optical path coupler is separately connected to the first carrier bearer network, the second carrier bearer network, and the electro-optic modulator, and the first optical path coupler is configured to couple an optical carrier transmitted by the first carrier bearer network and an optical carrier transmitted by the second carrier bearer network, and transmit a coupled optical carrier to the electro-optic modulator;

the electro-optic modulator is connected to the optical path decoupler, and the electro-optic modulator is configured to modulate, based on the service electrical signal, an optical carrier transmitted by the first optical path coupler, to obtain the service optical signal, and transmit the service optical signal to the optical path decoupler; and the optical path decoupler is further separately connected to the first service bearer network and the second service bearer network, and the optical path decoupler is configured to decouple the service optical signal, and transmit a decoupled service optical signal to at least one of the group of second nodes separately through the first service bearer network and the second service bearer network.

7. The optical communication system according to claim 5, wherein each first node comprises a first electro-optic modulator and a second electro-optic modulator that provide backup for each other, and the first electro-optic modulator is separately connected to the first carrier bearer network and the first service bearer network, and the first electro-optic modulator is configured to modulate, based on the service electrical signal, an optical carrier transmitted by the first carrier bearer network, to obtain a modulated service optical signal, and transmit the modulated service optical signal to at least one of the group of second nodes through the first service bearer network; and the second electro-optic modulator is separately connected to the second carrier bearer network and the second service bearer network, and the second electro-optic modulator is configured to modulate, based on the service electrical signal, an optical carrier transmitted by the second carrier bearer network, to obtain a modulated service optical signal, and transmit the modulated service optical signal to at least one of the group of second nodes through the second service bearer network.

8. The optical communication system according to claim 5, wherein each second node comprises a second optical path coupler and a photoelectric receiver, and the second optical path coupler is separately connected to the first service bearer network, the second service bearer network, and the photoelectric receiver, and the second optical path coupler is configured to couple a service optical signal transmitted by the first service bearer network and a service optical signal transmitted by the second service bearer network, and transmit a coupled service optical signal to the photoelectric receiver; and the photoelectric receiver is configured to demodulate the coupled service optical signal transmitted by the second optical path coupler.

9. The optical communication system according to claim 5, wherein each second node comprises a first photoelectric receiver and a second photoelectric receiver that provide backup for each other, and the first photoelectric receiver is connected to the first service bearer network, and the first photoelectric receiver is configured to demodulate a first service optical signal transmitted by the first service bearer network; and the second photoelectric receiver is connected to the second service bearer network, and the second photoelectric receiver is configured to demodulate a second service optical signal transmitted by the second service bearer network.

10. The optical communication system according to claim 1, wherein the first service bearer network is a star network.

11. The optical communication system according to claim 10, wherein the first service bearer network comprises a first optical waveguide, a service distributer, and a second optical waveguide, and both the first optical waveguide and the second optical waveguide are separately connected to the group of first nodes, the group of second nodes, and the service distributer; and the service distributer is configured to receive a service optical signal from at least one node of the group of first nodes and the group of second nodes through the first optical waveguide, couple the received service optical signal, split the coupled service optical signal, and transmit the split service optical signal to the group of first nodes and the group of second nodes separately through the second optical waveguide.

12. The optical communication system according to claim 11, wherein the service distributer is a star coupler, or the service distributer comprises an arrayed waveguide grating (AWG) and a third splitter, and one end of the AWG is connected to the first optical waveguide, the other end of the AWG is connected to an input end of the third splitter, and an output end of the third splitter is connected to the second optical waveguide.

13. A vehicle, wherein the vehicle comprises a vehicle-mounted controller, a vehicle-mounted sensor, a vehicle-mounted actuator, and an optical communication system; wherein the optical communication system comprises a light source, a first carrier bearer network, a second carrier bearer network, a group of first nodes, a first service bearer network, and a group of second nodes, wherein the first carrier bearer network and the second carrier bearer network provide backup for each other;

the light source is connected to the group of first nodes separately through the first carrier bearer network and the second carrier bearer network, and the light source is configured to transmit an optical carrier to the group of first nodes separately through the first carrier bearer network and the second carrier bearer network; and the group of first nodes is connected to the group of second nodes through the first service bearer network, and each first node is configured to modulate the optical carrier based on a service electrical signal to obtain a service optical signal, and transmit the service optical signal to at least one of the group of second nodes through the first service bearer network, and the vehicle-mounted sensor is connected to one or more of the group of first nodes in the optical communication system, and is configured to provide the service electrical signal for the one or more of the group of first nodes, and the vehicle-mounted controller is connected to one or more of the group of second nodes in the optical communication system, and is configured to receive a service electrical signal transmitted by the one or more of the group of second nodes; or the vehicle-mounted controller is connected to the one or more of the group of first nodes in the optical communication system, and is configured to provide the service electrical signal for the one or more of the group of first nodes, and the vehicle-mounted actuator is connected to the one or more of the group of second nodes in the optical communication system, and is configured to receive a service electrical signal transmitted by the one or more of the group of second nodes, wherein the light source comprises a first light source and a second light source that provide backup for each other, and the first light source is connected to the group of first nodes through the first carrier bearer network; and the second light source is connected to the group of first nodes through the second carrier bearer network.

14. The vehicle according to claim 13, wherein both the first light source and the second light source are single-wavelength light sources or wide-spectrum light sources, and the light source further comprises a first splitter and a second splitter, and the first light source is connected to the first carrier bearer network through the first splitter, and the first splitter is configured to split an optical carrier provided by the first light source, and transmit a split optical carrier to each first node separately through the first carrier bearer network; and the second light source is connected to the second carrier bearer network through the second splitter, and the second splitter is configured to split an optical carrier provided by the second light source, and transmit a split optical carrier to each first node separately through the second carrier bearer network.

15. The vehicle according to claim 13, wherein both the first light source and the second light source are multi-wavelength light sources;

the first light source is configured to output a plurality of single-wavelength optical carriers in parallel to the first carrier bearer network; and the second light source is configured to output a plurality of single-wavelength optical carriers in parallel to the second carrier bearer network.

16. An industrial optical network, wherein the industrial optical network comprises an industrial controller, an industrial sensor, an industrial actuator, and the optical communication system; wherein the optical communication system comprises a light source, a first carrier bearer network, a second carrier bearer network, a group of first nodes, a first service bearer network, and a group of second nodes, wherein the first carrier bearer network and the second carrier bearer network provide backup for each other;

the light source is connected to the group of first nodes separately through the first carrier bearer network and the second carrier bearer network, and the light source is configured to transmit an optical carrier to the group of first nodes separately through the first carrier bearer network and the second carrier bearer network; and the group of first nodes is connected to the group of second nodes through the first service bearer network, and each first node is configured to modulate the optical carrier based on a service electrical signal to obtain a service optical signal, and transmit the service optical signal to at least one of the group of second nodes through the first service bearer network, and the industrial sensor is connected to one or more of the group of first nodes in the optical communication system, and is configured to provide the service electrical signal for the one or more of the group of first nodes, and the industrial controller is connected to one or more of the group of second nodes in the optical communication system, and is configured to receive a service electrical signal transmitted by the one or more of the group of second nodes; or the industrial controller is connected to the one or more of the group of first nodes in the optical communication system, and is configured to provide the service electrical signal for the one or more of the group of first nodes, and the industrial actuator is connected to the one or more of the group of second nodes in the optical communication system, and is configured to receive a service electrical signal transmitted by the one or more of the group of second nodes, wherein the light source comprises a first light source and a second light source that provide backup for each other, and the first light source is connected to the group of first nodes through the first carrier bearer network; and wherein the second light source is connected to the group of first nodes through the second carrier bearer network.

17. The industrial optical network according to claim 16, wherein both the first light source and the second light source are single-wavelength light sources or wide-spectrum light sources, and the light source further comprises a first splitter and a second splitter, and the first light source is connected to the first carrier bearer network through the first splitter, and the first splitter is configured to split an optical carrier provided by the first light source, and transmit a split optical carrier to each first node separately through the first carrier bearer network; and the second light source is connected to the second carrier bearer network through the second splitter, and the second splitter is configured to split an optical carrier provided by the second light source, and transmit a split optical carrier to each first node separately through the second carrier bearer network.

* * * * *